United States Patent
Liebermann et al.

(10) Patent No.: US 7,233,249 B2
(45) Date of Patent: Jun. 19, 2007

(54) MULTI-BIT ENCODED GLASS-COATED MICROWIRE AND ARTICLES COMPOSED THEREOF

(75) Inventors: Howard H. Liebermann, Succasunna, NJ (US); William C. LaCourse, Alfred, NY (US); Alexis G. Clare, Alfred Station, NY (US); Wesley A. King, Almond, NY (US); James E. O'Keefe, Jr., Westwood, NJ (US)

(73) Assignee: Demodulation, Inc., Westwood, NJ (US)

( * ) Notice: Subject to any disclaimer, the term of this patent is extended or adjusted under 35 U.S.C. 154(b) by 315 days.

(21) Appl. No.: 10/935,258

(22) Filed: Sep. 7, 2004

(65) Prior Publication Data

US 2005/0109435 A1      May 26, 2005

Related U.S. Application Data

(60) Provisional application No. 60/502,340, filed on Sep. 12, 2003.

(51) Int. Cl.
*G08B 13/14*      (2006.01)

(52) U.S. Cl. .............. 340/572.6; 235/493; 164/462; 428/376; 428/378; 428/384; 428/611; 148/110

(58) Field of Classification Search .............. None
See application file for complete search history.

(56) References Cited

U.S. PATENT DOCUMENTS

| | | | |
|---|---|---|---|
| 4,484,184 A | 11/1984 | Gregor et al. | 340/572.2 |
| 4,501,490 A | 2/1985 | Miyamoto et al. | 355/55 |
| 4,940,966 A * | 7/1990 | Pettigrew et al. | 340/551 |

(Continued)

FOREIGN PATENT DOCUMENTS

WO      WO 01/29755 A1      4/2001

OTHER PUBLICATIONS

"*Pitkit Technologies Builds Portfolio of Israeli Authenticatoin Technologies", Authentication News, vol. 8 No. 5, Jun. 2002, pp. 1-2. *Bsecure is the new name of Pitkit Technologies.*

(Continued)

*Primary Examiner*—Benjamin C. Lee
(74) *Attorney, Agent, or Firm*—Ernest D. Buff & Associates, LLC; Ernest D. Buff; Gordon E. Fish

(57) ABSTRACT

A glass-coated amorphous metallic microwire is encoded with multi-bit digital information. Encoding is achieved magnetically, optically or through a combination of magnetic and optical encoding processes. Magnetic encoding is carried out by modifying the constituent magnetic domain structure through selective relief of interfacial stress between the glass coating and the amorphous metallic alloy core. It is also achieved by selective surface crystallization of the amorphous metallic core in order to produce a controlled magnetic bias field. Optical encoding is associated with the glass coating. It is readily achieved by fluorescent element deposition, patterned removal of fluorescent element coating, Bragg grating, and thermally activated pattern deposition. The magnetic and optical multi-bit encoding approaches for glass-coated amorphous metallic microwire can be used individually or collectively in either a redundant or a complementary manner. Encoded microwire of the instant invention can be assembled into tags for electronic article surveillance and into numerous other structures as well.

14 Claims, 4 Drawing Sheets

U.S. PATENT DOCUMENTS

| | | | | |
|---|---|---|---|---|
| 5,240,066 | A | | 8/1993 | Gorynin et al. .............. 164/461 |
| 5,477,219 | A | * | 12/1995 | Zarembo et al. .......... 340/572.3 |
| 5,729,201 | A | | 3/1998 | Jahnes et al. ............. 340/572.1 |
| 5,921,583 | A | | 7/1999 | Matsumoto et al. ........... 283/81 |
| 6,270,591 | B2 | | 8/2001 | Chiriac et al. ............... 148/300 |
| 6,417,771 | B1 | * | 7/2002 | Tyren ....................... 340/572.2 |
| 6,441,737 | B1 | * | 8/2002 | Antonenco et al. ...... 340/572.1 |
| 6,527,193 | B1 | * | 3/2003 | Beli et al. .................... 235/493 |
| 6,556,139 | B2 | * | 4/2003 | Manov et al. ............ 340/572.6 |
| 6,747,559 | B2 | * | 6/2004 | Antonenco et al. ...... 340/572.1 |
| 2005/0158545 | A1 | * | 7/2005 | Liebermann et al. ........ 428/384 |

OTHER PUBLICATIONS

Chiriac, Horia, *Preparation and Characterization of Glass-Covered Magnetic Wires, Materials Science and Engineering A304-306* (2001), p. 166-171.

Zhukov, A, *Microwires coated by glass: A new family of soft and hard magnetic materials*, J. Mater. Res., vol. 15, No. 10, Oct. 2000.

Hirao, K., *Writing Waveguides and Gratings in Silica and Related Materials by a Femtosecond Laser, Journal of Non-Crystalline Solids*, 239 (1998) pp. 91-95.

Barker, M.F., *Photomachinable Glass-Ceramics of Controlled Thermal Expansion, Journal of Non-Crystalline Solids* 104 (1998), pp. 1-16.

Ben-Yaker, Adela, *Morphology of Femtosecond-Laser-Ablated Borosilicate Glass Surfaces, Applied Physics Letters*, vol. 83, No. 15,(2003), pp. 3030-3032.

Chirsey, D.B., *New Approach to Laser Direct Writing Active and Passive Mesoscopic Circuit Elements, Applied Surface Science* 154-155 (2000) pp. 593-600.

Fitz-Gerald, J.M., *Laser Direct Writing of Phosphor Screens for High-Definition Displays, Applied Physics Letters*, vol. 76, No. 11, (2000) pp. 1386-1388.

Cheng, Y., *Advanced Irradiaton Methods of Femtosecond Laser for Embedded Microfabrication of Transparent Materials, SPIE* vol. 4830 (2003) pp. 479-483.

* cited by examiner

US 7,233,249 B2

MULTI-BIT ENCODED GLASS-COATED MICROWIRE AND ARTICLES COMPOSED THEREOF

This application claims the benefit of U.S. Provisional Application No.: 60/502,340, filed Sep. 12, 2003.

BACKGROUND OF THE INVENTION

1. Field of the Invention

This invention relates to glass-coated amorphous or nanocrystalline alloy microwire for electronic article surveillance and other systems; and more particularly to articles composed of such microwires, which have multi-bit encoding/reading capabilities.

2. Description of the Prior Art

Electronic Article Surveillance (EAS) systems are used to electronically detect goods that have not been authorized when they are removed from a retailer. The systems comprise a marker attached to the goods and a sensor mechanism. The retailer can neutralize the marker when he wishes to authorize the removal of the goods, for example when the items have been legitimately purchased.

One type of EAS marker, termed harmonic or electromagnetic, is disclosed by U.S. Pat. Nos. 4,484,184 and 5,921,583. Such a marker comprises a plurality of strips or wire segments of ferromagnetic amorphous magnetic material that resonate electromagnetically and thereby generate harmonics in the presence of an incident magnetic field that has a preselected frequency and is applied within an interrogation zone. Generation of harmonics under these conditions provides marker signal identity. An unmagnetized permanent magnet in the vicinity of the resonating plurality of strips or wire segments can be magnetized or demagnetized to inactivate or re-activate said marker.

Another type of marker, described as being acoustomagnetic or magneto-mechanical, is disclosed by U.S. Pat. No. 4,510,490. In this system, a marker is adapted, when energized, to mechanically resonate at preselected frequencies that are provided by an incident magnetic field applied within an interrogation zone. The marker has a plurality of elongated ductile strips of magnetostrictive ferromagnetic material. Each of the strips is disposed adjacent to a ferromagnetic element which, upon bring magnetized, magnetically biases the strips and energizes them to resonate at the preselected frequencies. A substantial change in effective magnetic permeability of the marker at the preselected frequencies provides the marker with signal identity.

The prior art technologies described hereinabove provide a method and means for sensing the presence of an object to which a marker is affixed.

In related technologies, multi-bit rather than single-bit (on/off) markers have been described in the technical and patent literature. For example, a publication by Zhukov et al., J. Mater. Res. 15 No. 10 Oct. (2000), reports on the ability to produce a multi-bit marker when utilizing multiple amorphous glass-coated wire segments, each having a different dimension (length, alloy vs. gross diameter, etc.) or magnetic property (coercive field, etc). A multi-bit marker disclosed by U.S. Pat. No. 5,729,201 to Jahnes describes a similar marker containing multiple wires; but wherein all wires have the same chemistry and geometric dimensions. A permanent magnet bias field element in the vicinity of an array of amorphous metallic wires serves to differentiate the drive field, at which harmonic response is obtained, by way of proximity of each individual wire segment to the permanent magnet bias field element, thereby providing multi-bit capability. PCT patent publication WO 01/29755 A1 to Antonenco et al. describes a multi-wire marker that is capable of multi-bit performance. As with the Jahnes teaching, each of the microwire segments utilized in the construction of the marker have the same chemistry and geometric dimensions. Antonenco et al. disclose arranging the microwires in a manner similar to stripes in a conventional optical bar code. Information concerning the Antonenco et al. marker is read using a magnetic reading head.

Each of the encoded markers described in the technical and the patent literature requires the use of a plurality of magnetic elements (strips or wire segments). These multiple magnetic elements must be carefully arranged with respect to each other. They increase the size, weight and cost of the marker and, unless accurately positioned thereon, decrease its identifying characteristics.

There remains a need in the art for a glass-coated amorphous or nanocrystalline alloy microwire marker that is light weight, small, inexpensive to construct and highly reliable in operation.

SUMMARY OF THE INVENTION

The present invention provides a multi-bit encoded glass-coated alloy microwire and articles produced therefrom. Also provided by the invention is a process for encoding of the amorphous or nanocrystalline alloy microwire and article. Advantageously, the invention obviates the need for multiple segments of microwire when manufacturing an encoded article such as an EAS marker. Surprisingly, it has been discovered that altering either the ferromagnetic amorphous alloy core or the glass outer layer of an amorphous glass-coated wire enables production of microwire and articles having multi-bit encoding capability. This is the case even when the encoded marker comprises a single segment of microwire. Encoding is afforded either magnetically, or optically; or by a combination thereof. This feature provides the additional advantage of enabling either redundant or complementary systems to be operative in a single segment of ferromagnetic amorphous glass-coated microwire.

Numerous, highly advantageous uses for glass-coated articles produced in accordance with the present invention are disclosed hereinafter in greater detail.

BRIEF DESCRIPTION OF THE DRAWINGS

The invention will be more fully understood and further advantages will become apparent when reference is had to the following detailed description and the accompanying drawings, in which.

DETAILED DESCRIPTION OF THE INVENTION

Figure 1:
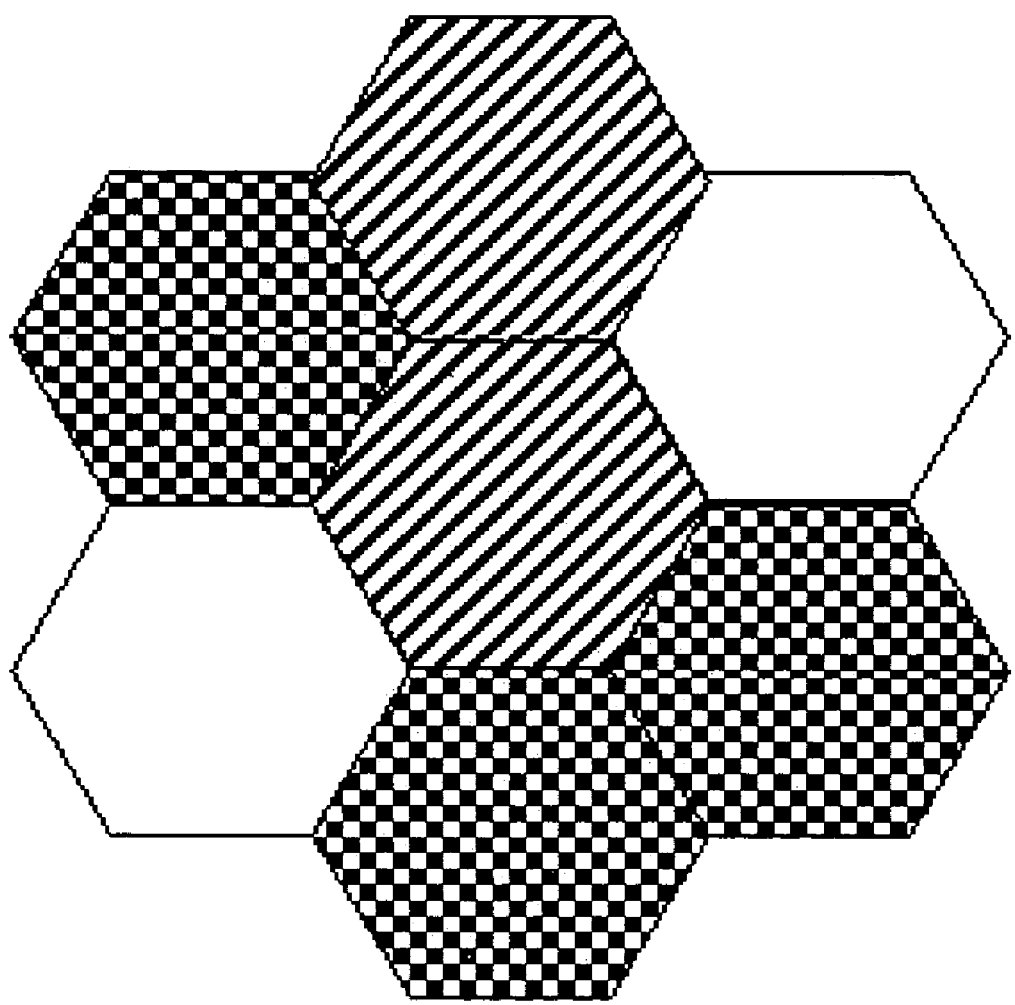
FIG. 1 is a cross-sectional view depicting bundled amorphous glass-coated microwires having various chemistries and dimensions, constituent microwires within a bundle having hexagonal outer shapes for maximized spatial packing.

As used herein, the term "amorphous metallic alloy" means a metallic alloy that substantially lacks any long-range order and is characterized by x-ray diffraction intensity maxima that are qualitatively similar to those observed for liquids or oxide glasses. By way of contrast, the term "nanocrystalline metallic alloy" pertains to those metallic alloys having constituent grain sizes on the order of nanometers.

The term "glass", as used throughout the specification and claims, refers to an inorganic product of fusion that has cooled to the solid state without crystallizing, or to glassy materials formed by chemical means such as a sol-gel process, or by "soot" processes, both of which are used to form glass preforms that are used in fiber optic processing. These materials are not fused; but rather are consolidated at high temperatures, generally below the fusion temperatures of the constituents in question.

The term "preform", as used herein, refers to the glass vessel in which alloy is melted and subsequently drawn into microwire.

The term "drawing", as used herein, refers to the extension of a material using a tensile force, the extension resulting in a permanent reduction of the material's cross-sectional area.

The term "article", as used herein, refers to a geometric body comprising, at least in part, ferromagnetic amorphous alloy microwire.

The term "microwire", as used herein, refers to a thin element, which may be continuous or non-continuous, of circular or non-circular cross-section, and which has a transverse dimension less than about 50 µm, and comprises at least one metallic material.

The term "bundle", as used herein, refers to a multiplicity of amorphous glass-coated microwires that are bound together and act as a single element, possibly carrying multi-bit digital data.

The term "thermal contraction coefficient", as used herein, refers to the amount of length change of a material per unit length of that material, and per unit temperature, when the material is cooled from a high temperature to a low temperature.

The term "magnetostriction", as used herein, refers to the change in dimensions of a magnetic material when subjected to a magnetic field.

Glass-coated amorphous and nanocrystalline alloy microwire and its production have been disclosed in the technical and patent literature [see, for example, U.S. Pat. Nos. 6,270,591 and 5,240,066; Horia Chirac, "Preparation and Characterization of Glass Covered Magnetic Wires", *Materials Science and Engineering* A304–306 (2001) pp. 166–171]. Continuous lengths have been produced by melting either a pre-alloyed ingot or the required elemental constituents in a generally vertically disposed glass tube that is sealed at the bottom. Once the alloy is converted to a molten state, using radio frequency ("r.f") heating for example, the softened bottom of the glass tube is grasped and drawn into continuous microwire. Rapid reduction of alloy cross-section, together with use of secondary cooling means, cause the alloy to become amorphous or nanocrystalline during drawing. The technical and patent literature suggests use of nominally round glass tubing for this glass-coated microwire drawing process. Products resulting from such microwire drawing processes typically exhibit circular cross-sections.

Ferromagnetic amorphous glass-coated microwires having positive magnetostriction are based on Fe-based alloys. Such Fe-based alloy microwires show outstanding magnetic properties due to their specific magnetic domain structure and magnetoelastic anisotropies. A general attribute of Fe-based alloy microwires is the presence of a large Barkhausen effect, that is, an abrupt jump of the magnetization almost to the saturation value at a certain value of an applied magnetic field, called the switching field. The switching field can be tailored over a large range of values from the preparation process through the wire dimensions. In addition, the squareness of the magnetization loop ensures the presence of higher order harmonics, which enables more reliable performance in anti-theft applications, for example. Ferromagnetic amorphous glass-coated microwire having positive magnetostriction has an axially magnetized inner core and a radially magnetized outer shell that result from the magnetoelastic coupling between internal stresses and the positive magnetostriction.

The stress sensitivity of ferromagnetic amorphous glass-coated microwire can be used advantageously as the physical basis for affecting magnetic domain structure. In fact, ferromagnetic amorphous glass-coated microwire encoding can result from a localized alteration of this domain structure. The alteration is readily accomplished by imposition of localized stresses or by selective crystallization of the amorphous alloy. Such changes are affected by a number of means, including localized heating via pulsed laser, chemical thinning of the glass coating, coatings on the glass, and the like. Particularly important for ferromagnetic amorphous glass-coated microwire, localized modification of the glass coating can be used to effectively produce controlled changes in the magnetic domain structure of the amorphous alloy core in order to enable encoding. A particularly innovative approach is to provide complementary optical encoding of the glass coating, via fluorescent ions, for some applications.

A national economic benefit from this program will constitute the emergence of a potentially multi-billion dollar EAS business. In addition, Fe-based amorphous or nanocrystalline microwire technology will have an significant impact in brand protection and anti-forgery applications, thereby saving domestic retailers billions of dollars in shrinkage and grey market losses. Manufacturing and high security operations will be based in the United States. Furthermore, our products will address a number of homeland/national security needs.

I. Magnetic Encoding of the Ferromagnetic Amorphous Metal Alloy Microwire Core Several methods of magnetic encoding are possible, particularly when the amorphous alloy exhibits a magnetostrictive effect. The magnitude of the effect is dependent on the stress extant in the ferromagnetic amorphous glass-coated microwire, and on the microwire structure. Stress is determined by:

1. Alloy composition and structure;
2. Thermal expansion mismatch between the glass and the alloy;

3. Cross-sectional area ratio of the glass and alloy sections, cross-sectional geometry (e.g. rectangular vs. cylindrical);
4. Interfacial bonding between the alloy and glass; and
5. Drawing conditions—cooling rates.

These factors provide several means for altering the magnetic properties of the ferromagnetic amorphous alloy. The method of choice is to use laser pulses to locally heat the glass or alloy (independent heating can be accomplished by choice of wavelength) causing changes in the structure of one or both, and thereby altering the extant stress fields or the basic magnetic characteristics.

Thermal Processes

UV/Visible Lasers: Most silicate glasses are transparent from about 30.0 nm to 2.5 µm, and such lasers can be used for preferential heating of the alloy. Heating can accomplish two physical changes:

The local residual stress will be changed due to the change in "fictive temperature" of the amorphous metallic alloy. The fictive temperature describes the structure of the glass. A high fictive temperature implies that a high-temperature melt structure has been frozen in. This implies a rapidly cooled material with no annealing. A low fictive temperature implies a structure representative of the melt at low temperature, and is obtained by slower cooling or by subsequent reheating to anneal. Heating to temperatures above the glass transition range is required.

A much larger effect occurs by causing full or partial local crystallization of the alloy. Here one needs heat to the crystallization temperature.

Importantly, in some amorphous alloys, crystallization occurs at two distinct temperatures. For example, in the ferromagnetic $Fe_{77.5}Si_{7.5}B_{15}$ system, it is possible to cause partial crystallization by heating to about 773 K (500° C.). Full crystallization of the primary phase does not occur unless the alloy is heated to near 823 K (550° C.).

Crystallization can be quite rapid and there are several processing parameters that can be adjusted to provide the desired effect in a time period consistent with rapid manufacturing. These processing parameters include laser power, time of irradiation, and importantly, the ambient temperature that allows control of amorphous glass-coated microwire cooling rate. It may therefore, only be required to rapidly raise the temperature to some appropriate value and allow the material to cool naturally to an elevated ambient temperature.

Infrared Lasers: Infrared lasers (e.g. $CO_2$) can be used to preferentially heat the glass coating, since oxide glasses are essentially opaque at 10.6 µm. This permits several alterations of the glass that can cause changes in the magnetic behavior of the wire: (i) local stress relief to alter the fictive temperature of the glass; and (ii) local crystallization or phase separation of the glass.

Non-Thermal Processes:

Since stress on the ferromagnetic amorphous alloy core of microwire is influenced by the thickness of the glass coating, the magnetic behavior can be altered by localized thinning of the glass using chemical etching to alter the local stress on the amorphous alloy core. Here one could adapt etching techniques, such as photo-masks and the like, which are used in the semiconductor industry. Magnetic behavior can also be altered by uniform coating with selective removal of the coating to provide the same effect.

II. Optical Encoding of the Ferromagnetic Amorphous Metal Alloy Microwire Glass Coating As noted above, it may often be advantageous to have complementary encoding for redundancy, for extra security, or so that encoding can be detected at different distances. One method for obtaining this result involves introduction of coloring or fluorescent ions into the glass preform used in the production of amorphous glass-coated microwire. With this procedure, there are provided the following possibilities. Uniformly colored or a fluorescent glass, both of which are detectable spectroscopically, will provide complementary detection mechanisms, and will be more difficult for unauthorized individuals to reproduce. Such a system would be highly advantageous in anti-counterfeiting applications. As an additional possibility, locally fluorescent glass, produced by post-drawing permanent coatings, provides a wide range of encoding opportunities.

Uniform fluorescence or color can be produced by using a glass preform doped with the selected ion(s) or by post-forming coatings. Local fluorescence can be produced in two general ways: (i) coating a non-fluorescent glass with a fluorescent ion; and (ii) coating a uniformly fluorescent glass with a light-absorbing material that absorbs the emitted light.

Other optical encoding options include, but are not limited to, the use of adherent, durable fluorescent coatings that can be applied by several processes, and with several different material matrices (ceramic, glass, polymer).

1. Local laser printing of ceramic for high resolution printing on glass Transparent inks can be doped with the appropriate fluorescent ion(s).
2. Sol-gel coatings of glass or ceramics. These materials generally require heating to near 773 K (500° C.) for fusing to the surface, although "ormosils" (organically modified silicates) may be consolidated at lower temperatures. Local coatings can be applied through a mask, or a full coating can be applied during fiber drawing and selectively removed. Adding fluorescent ions to sol-gel-derived glasses and coatings is a well-established science. It is even possible in some low temperature sol-gel derived materials, to employ organic dyes.
3. Polymer coatings offer some advantage in processing, but the durability and adhesion may not be sufficient for some applications. Fluorescent organic dyes can also be used in a polymer matrix due to the low temperature formation. Polymer coatings are commonly applied to and UV cured on, fiber optic materials during drawing. Selective removal can be done chemically using masks, or thermally (evaporation/carbonization) using focused laser irradiation of the appropriate wavelength.
4. Thin film processes can be used to deposit $SnO_2$ as well as other candidate materials.

Most fluorescent ions are activated using UV light. The fluorescence is detected using optical sensors. Short distance decoding can be accomplished using fiber optic systems such as those used in xerography, and endoscopes. Extremely complex signals can be detected and decoded.

Any of the coating materials can be applied to the glass during fiber drawing. For metals one draws the fiber through low melting temperature molten metal. The thickness is controlled by the orifice size of the fixture, which contains the metal, but is generally more than a few microns. The coating can be selectively removed by a number of techniques such as chemical or ion-beam etching. Alternatively, the metal coating can be applied by thin film techniques.

Polymer and sol-gel derived glasses can be applied in a similar manner or by spraying.

III. Combined (Magnetic/Optical) Encoding of the Ferromagnetic Amorphous Metal Alloy Microwire Core and Glass Coating The glass-alloy composite structure permits a variety of additional encoding/detection combinations. One approach involves use of thermal fiber imaging. An external magnetic field is applied, causing energy absorption and heating by the alloy. Localized temperature differences develop along the fiber, depending on it's encoding. The resulting temperature differences can be detected optically by the following processes:
1. Direct fiber optic imaging of the infrared emission due to the temperature difference; and
2. Use of europium-doped glass as the coating. Europium fluorescence is extremely sensitive to temperature and differences of much less than 1 K can be detected. Again, the signal could be transmitted through fiber optics.

IV. Geometrical Encoding of the Ferromagnetic Amorphous Metal Alloy Microwire The signal from an amorphous glass-coated microwire segment is a function of its geometry. Using well-developed fiber optic technology it is possible to produce:
1. Single amorphous glass-coated microwire with non-circular cross-section; and
2. Multi-wire bundles of various geometries and/or with the composition and properties of the individual constituent microwires being different.

Bundling of ferromagnetic amorphous glass-coated microwires having various cross-sectional shapes provides the opportunity for increased magnetic output as well as increased encoding density capability. For example, bundling of metallic amorphous glass-coated wire having various properties can be achieved with in-line processing. Note that multi-fiber bundles can be sliced in a direction taken perpendicular to the drawing direction to produce a structure similar to that shown in FIG. 1. In the structure therein shown, the view is taken in a direction looking down the length of the bundle. The various shadings indicate different compositions and show that either binary or other encoding is possible through the use of such a microwire bundle.

Figure 2:
FIG. 2 is a cross-sectional representation of a multi-microwire bundle having a "strip" geometry.

Another particularly useful "strip" geometry is shown in FIG. 2. This strip geometry is similar to that of a conventional barcode and could be used as such. Techniques such as endoscopes, employed for production of fiber optic bundles, create structures having thousands of fibers. The limit in the present case will likely be set by the ability to cool fiber bundles rapidly enough to prevent crystallization of the amorphous metallic alloy core.

Amorphous metallic glass-coated microwire geometry and cooling rate during production affect the magnitude of induced stresses, which in turn impact magnetic properties via magnetostriction. Also, cooling rates during production are influenced in part by its geometry, thus enabling the formation of a variety of novel magnetic structures/phases.

The multi-bit encoded glass-coated microwire of the present invention can be used in conjunction with metallic alloys having various compositions, whether such alloys are amorphous, nanocrystalline, or otherwise. The present invention can also be used with various kinds of glasses of which the preforms are made.

Glass-coated amorphous or nanocrystalline microwire of the instant invention can readily be tailored for use with an extensive variety of distinct applications through the appropriate selection of metal alloy and glass chemistries, and the control of alloy and glass dimensions. The ability to magnetically and/or optically store information in or on the microwire by multi-bit encoding/reading capabilities enables a multitude of additional applications in which information exchange is required. Among other benefits, magnetically and/or optically encoded glass-coated amorphous microwire is a passive device. It requires no internal power source, with the result that device size and cost are reduced relative to non-passive devices. An additional benefit resides in the ability to store information using either or both magnetic and optical encoding. This feature allows for complimentary functionality and/or redundancy in which the reading of each encoding type can be independent. Reading of information stored either magnetically or optically can be accomplished either at close proximity or from a distance. Optical reading is a line-of-sight process, whereas magnetically stored information has the additional benefit of not being limited as a line-of-sight process. Some optical and magnetic encoding techniques must be practiced while the glass-coated amorphous or nanocrystalline microwire is manufactured. This approach provides additional benefits in those applications requiring brand authentication, security and anti-counterfeiting functionality. Other types of optical and magnetic encoding can be carried out either during glass-coated amorphous or nanocrystalline microwire manufacture or at the point-of-use, thereby providing flexibility for many end-use applications. In addition, the encoding of the glass-coated amorphous or nanocrystalline microwire of the instant invention provides a critical link to establishing low-cost systems wherein multi-bit information storage media is read remotely. Further advantages of encoded glass-coated amorphous or nanocrystalline microwire are its small size and continuous nature, which provide the benefits of unobtrusiveness and high-speed incorporation, respectively, to certain applications. The remarkable physical properties of the glass-coated amorphous or nanocrystalline microwire facilitates its incorporation as a component onto or into a vast variety of materials, including paper, paperboard, foils, corrugated papers, converted paper products, cardboard, paper laminations, plastics, polymers, and textiles, which includes yarns, threads, woven products, ribbons and the like, and combinations of these materials. Having been incorporated onto or into any of the above materials or by itself, the glass-coated amorphous or nanocrystalline microwire may be used to make composite structures comprising alloys, ceramics, plastics, glasses and liquids.

Applications for the aforementioned systems include enhanced inventory control, cradle to grave tracking of livestock and related food products, designer product authentication, tracking and anti-diversion, for example cigarette products, driver's licenses, identification cards, passports, and various other documentation of import, including currency, commercial instruments and the like. Additional applications where special functionality derives from the incorporation of encoded glass-coated amorphous or nanocrystalline microwire include credit cards, retail gift/merchandise cards, smart labels and smart packaging for the retail, industrial and government markets, all forms of ticketing, for example event and transportation ticketing, identification and tracking of biomedical items and living organisms. One specific use of the combined optical and magnetic capabilities of the glass-coated amorphous or nanocrystalline microwire is to facilitate retail customer self-checkout. This device combines both EAS (electronic Article Surveillance) simultaneously with the ability to optically/magnetically scan data. The low cost ease of application and combined features of EAS, inventory data management and checkout scanning make this ideal for food and grocery stores. The use of optical and magnetic capabilities of the glass-coated amorphous or nanocrystalline microwire will also be applied as an item level interface that will transmit and communicate information to RFID tags. Glass-coated amorphous or nanocrystalline microwires may also be used in the technology of smart antennas. Specifically, such glass-coated amorphous or nanocrystalline microwires find use as the on-off elements of phased array systems.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

Figure 3:
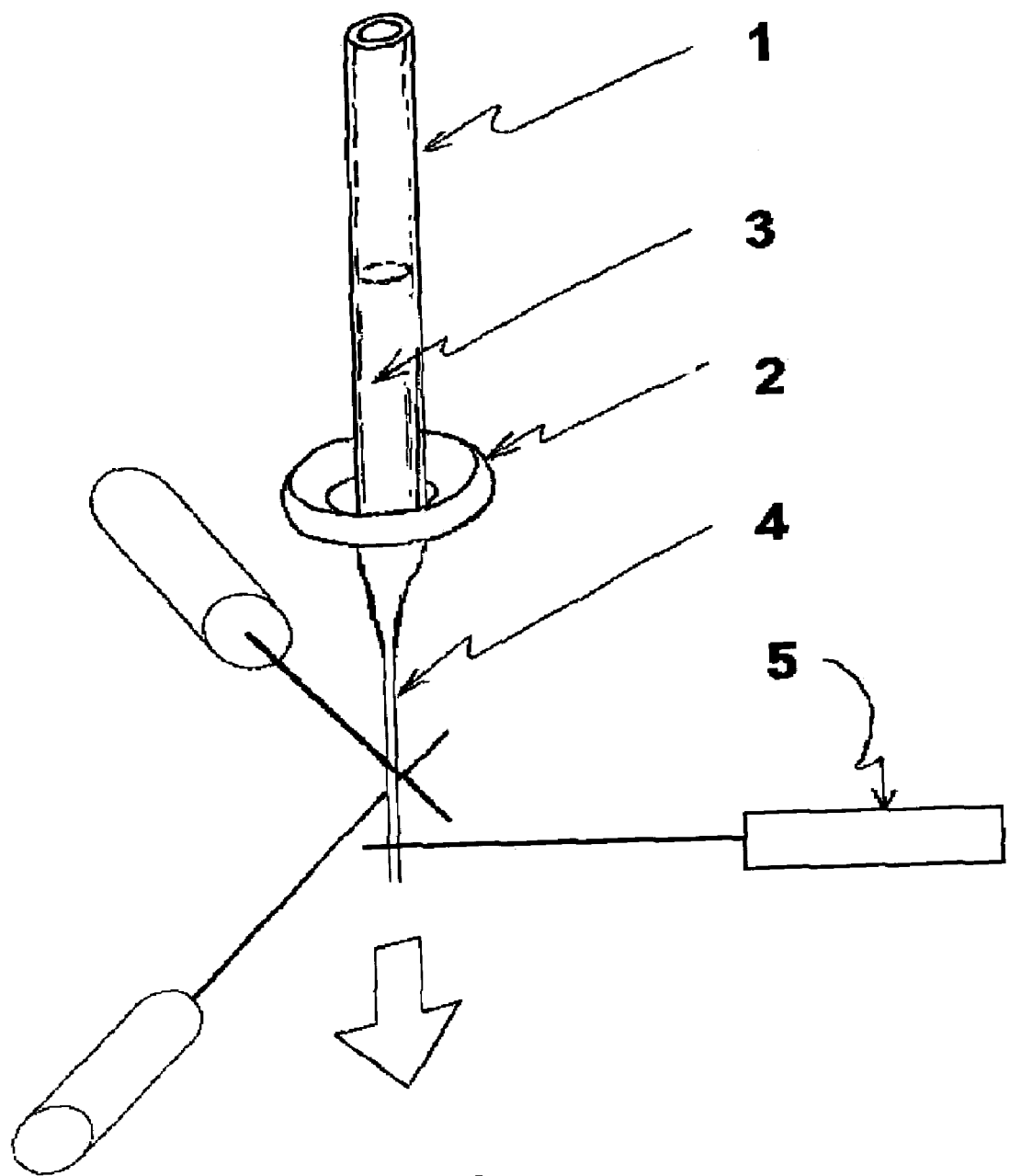
FIG. 3 is a perspective view showing glass-coated microwire produced by drawing from a round glass tube, along with three lasers, the laser beams being directed at the microwire during its drawing in order to provide mult-bit encoding.

An ingot composed of an amorphous-forming metallic alloy is prepared by loading the appropriate weights of constituent elements into a quartz tube that is sealed at one end. The other end of this quartz tube is connected to a pressure-vacuum system to allow evacuation and back-filling with Ar gas several times to ensure a low oxygen Ar atmosphere within the quartz tube. Next, the closed end of the quartz tube in which the elements reside is introduced into a high frequency induction-heating coil. With the application of radio frequency ("r.f.") power, the elements inside the tube are caused to heat and melt into a stirred, homogeneous metallic alloy body. When the r.f. power is shut off, the alloy body is allowed to cool to room temperature in the Ar atmosphere. Once cooled, the same metallic alloy body is inserted into the bottom of a vertically disposed glass tube 1 (preform), having 6-mm diameter that is sealed at the lower end, as depicted in FIG. 3. The upper end of this preform is connected to a pressure-vacuum system to allow evacuation and back-filling with Ar gas several times to ensure a low oxygen Ar atmosphere within the quartz tube. A specially built inductor 2 at the bottom of the preform is energized with r.f. power in order to heat and then melt the metallic alloy body 3 within the tube. Once the metallic alloy body is molten and heated above its liquidus temperature by some 20 to 50° C., a solid glass rod is used to touch and bond to the bottom of the sealed glass preform in which the molten metallic alloy resides. The heat of the molten metallic alloy softens the glass preform allowing it to be drawn by pulling on the glass rod to which it is attached. Molten metallic alloy is entrained in the drawn glass capillary 4 that results. The drawn capillary is then pulled and guided onto a spinning take-up spool, which provides both winding tension to ensure continuous drawing at a rate of about 5 meters/second and a systematically wound article (microwire) package.

Amorphous glass-coated microwire about 30 μm in diameter is produced using the procedure described above. The microwire has an $Fe_{77.5}B_{15}Si_{7.5}$ amorphous alloy core that is under axial tensile stress. The glass from which the preform was made, and which coats the microwire, is commercially available Pyrex.

During this process, three sources of infrared laser light (e.g. $CO_2$) 5 are situated in three planes that are perpendicular to the direction in which the microwire is being drawn. The beams from these three laser light sources are parallel and disposed at 120° with respect to one another. Furthermore, each of these three laser light beams are brought into various degrees of contact with the microwire as it is being drawn. This results in a controllable degree of interfacial stress relief between the glass coating and the amorphous alloy core in three bands down the length of the microwire. This results in a magnetization loop having greater or less squareness locally down the affected zones in the microwire, depending on whether in-line laser treatment was lower power or higher power.

Digital encoding is then achieved by the degree to which high harmonics are present, if at all. A greater extent of interfacial stress relaxation will result in lower amplitude of higher order harmonics. Three bits of digital encoding are possible, given the equipment configuration of this Example. The number of encodable bits of information scales directly with the number of laser beams used.

Reading of the encoded bits is readily achieved by methods described in the Prior Art. Multi-bit encoding of amorphous glass-coated microwire can also be achieved on a post-drawing incremental basis, rather than on a continuous basis.

EXAMPLE 2

A different means of magnetic encoding is achieved by using the methods, materials, and apparatuses of Example 1, except that UV/visible light laser sources are now used. The result is varied degrees of surface crystallization of the amorphous alloy core of the microwire. Three bands of controlled amorphous alloy surface crystallization run the length of the amorphous glass-coated microwire. A magnetization loop is thereby produced that is locally magnetically biased to different extents, depending on the power level setting of each of the three lasers used. The result is encoding that is achieved by the relative translation (bias) of the surface crystallized stripes down the length of the amorphous glass-coated microwire.

Three bits of digital encoding are possible, give the equipment configuration of this Example. The number of encodable bits of information scales directly with the number of laser beams used.

Reading of the encoded bits is readily achieved in the conventional way. Multi-bit encoding of amorphous glass-coated microwire can also be achieved on a post-drawing incremental basis, rather than on a continuous basis.

EXAMPLE 3

A pulsed UV/visible light laser is utilized to produce circumferential rather than longitudinally surface crystallized zones of the amorphous alloy core in the amorphous glass-coated microwire. "Cells" along the length of the microwire will be magnetically biased to different extents, depending on the amount of laser power absorbed, and thereby provide multi-bit encoding capability.

Reading of the encoded bits is readily achieved by conventional methods. Multi-bit encoding of amorphous glass-coated microwire can also be achieved on a post-drawing incremental basis, rather than on a continuous basis.

EXAMPLE 4

Local thinning of the glass coating by a variety of means, including laser ablation, is used to adjust interfacial stress between the amorphous metallic alloy core and the glass coating. Thus, this results in a controllable degree of interfacial stress relief between the glass coating and the amorphous alloy core in bands down the length of the microwire. This results in a magnetization loop having greater or less squareness locally down the affected zones in the microwire, depending on whether in-line laser treatment was lower power or higher power.

Reading of the encoded bits is readily achieved by conventional methods. Multi-bit encoding of amorphous glass-coated microwire can also be achieved on a post-drawing incremental basis, rather than on a continuous basis.

EXAMPLE 5

A marker, possibly used in EAS applications, comprised of a plurality of multi-bit encoded amorphous glass-coated microwire segments is prepared by affixing three such encoded microwire segments to a plastic substrate using thin double-sided adhesive tape. These microwire segments are arranged to be essentially parallel to one another and with an inter-wire spacing of about half a millimeter. Once positioned securely, thin double-sided adhesive tape is applied to an upper plastic substrate and then carefully mated to the lower substrate/tape/microwire assembly to form the final marker.

The multi-bit encoded amorphous glass-coated microwire segments utilized in producing the EAS marker need not all be from the same parent material. In fact, additional encoding capability is possible by utilizing multi-bit encoded amorphous glass-coated microwire segments having different lengths and/or diameters.

Reading of the encoded bits is readily achieved by conventional methods.

EXAMPLE 6

A bundle of microwire is produced according to the method of Example 1, except that no laser sources are now implemented and a specially made multi-chamber preform is now used in the drawing operation. This allows alloys of different chemistries to be charged into each of the chambers, thereby providing an as-drawn encoded article comprising a plurality of constituent microwire elements.

EXAMPLE 7

Making preforms from glass that is not commercially available as tubing can be essential to enabling various kinds of optical encoding. Glass is molten by first combining the batch components in a suitable crucible (platinum, platinum/rhodium, silica, vitreous carbon) and inserting the crucible into a furnace set at a suitable temperature to ensure a low viscosity. Once the melt is homogenized the glass is cast into a mold. The mold is set spinning and tipped to an angle of 45°. The glass is pushed to the outside wall of the mold by centripetal force, thus making a tube or preform. The tube is subsequently annealed in the mold at a temperature appropriate to the composition. For some glasses sensitive to oxygen or water it may be necessary to carry out this procedure in a glove box. Optimal process temperatures are unique to each glass composition. These glass preforms are then used to manufacture the microwire as described hereinabove.

Preforms that result in amorphous glass-coated microwire that can be optically encoded with the use of rare earth ions are made in accordance with the procedure described above, except rare earth compounds appropriate for that composition (e.g. a rare earth fluoride in a fluoride glass, a phosphate in a phosphate glass and the like) would be added to that batch. Rare earth elements in glass have very distinctive optical signals that can be interrogated. A hand held spectrometer such as is available from Ocean Optics Inc. can be used to interrogate the glass-coated microwire. Furthermore, light of a specific wavelength from a laser or light emitting diode is shone at the microwire the intensity of light emitted at a longer wavelength is measured. Several emission wavelengths can be read for a single excitation wavelength. Temperature measurement using this kind of amorphous glass-coated wire is achieved by utilizing and exciting light that is pulsed and the emission decay time of the signal measured by gating the pulse and measuring the time for the intensity to drop to below noise. The emission decay time is significantly altered by temperature. Temperatures can be read to a resolution of far below 1K.

For more complex encoding, more than one rare earth element may be incorporated into the glass and the ratio of two emission lines measured. Unique ratios can be assigned to particular vendors. As above the ratio of emission lines in co-doped glass is very temperature dependent, the above arrangement can be used as a temperature sensor.

EXAMPLE 8

Glass preforms doped with transition metal ions are produced using a procedure similar to that described in Example 6. Melting the glass into a tube is carried out as described above except that to the batch are added transition metal compounds appropriate for the composition (e.g. a transition metal fluoride in a fluoride glass, a phosphate in a phosphate glass, etc.). Transition metal elements in glass have very distinctive optical signals that can be interrogated. A hand held spectrometer such as is available from Ocean Optics can be used to interrogate the fiber. Light of a specific wavelength from a laser or light emitting diode is shone at the microwire. The intensity of light emitted at a longer wavelength is measured. Several emission wavelengths can be read for one excitation wavelength. Transition metal-doped amorphous metallic alloy microwire glass coating can be used for temperature measurement because many of the transition metals undergo vibronic transitions therefore their peak positions are temperature sensitive.

EXAMPLE 9

Figure 4:
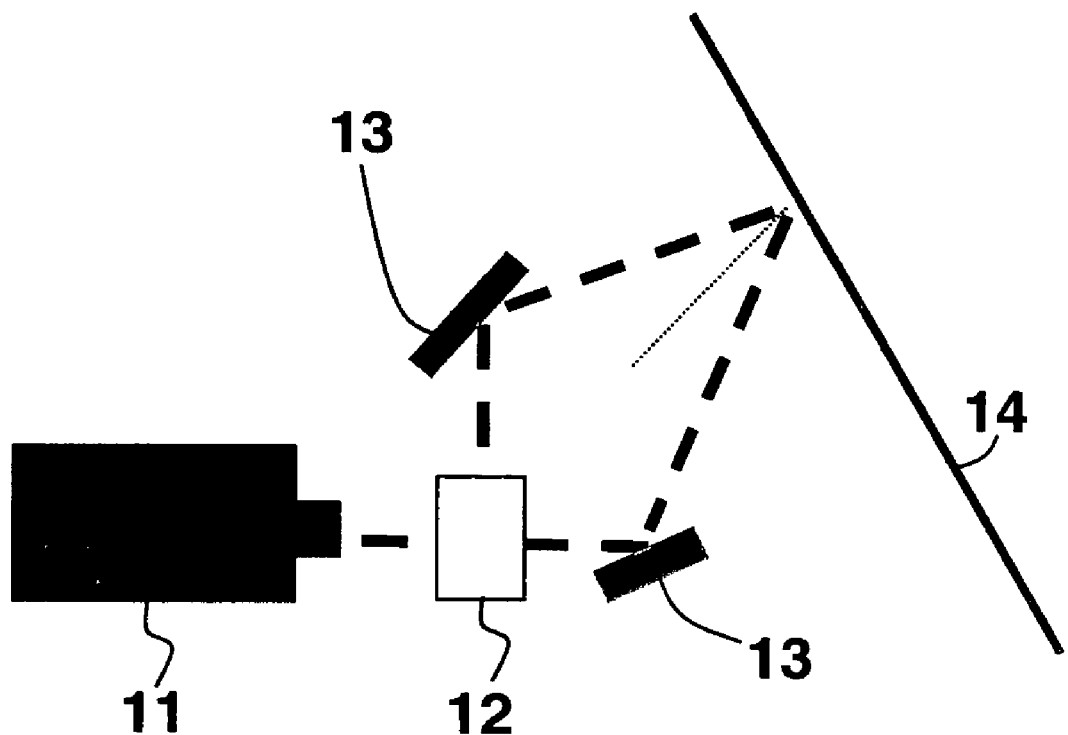
FIG. 4 schematically shows a system for optical encoding via the creation of Bragg gratings wherein a beam from a UV laser is passed through a beam splitter and through reflecting optics, and made to approach the microwire from two equal angles on either side of the normal to the wire, the beams being both temporally and spatially coherent, so that a well defined pattern of intensity maxima and minima are set up.

Post drawing optical encoding is accomplished by a periodic variability in the refractive index of the glass, which is achieved by optically or chemically writing a grating. Periodic gratings are optically written. The beam from a UV laser (e.g. coherent FRED laser) 11 is passed through a beam splitter 12 and through reflecting optics 13 made to approach the microwire 14 from two equal angles either side of the normal to the wire as depicted in FIG. 4. Since the beams are both temporally and spatially coherent, a well-defined pattern of intensity maxima and minima are set up. Varying the angle to the wire normal controls the pitch of the maxima and minima. Depending on the glass composition, a photo-induced reaction takes place at the points of high intensity (e.g. compaction for silica). Such gratings are chemically enhanced through the UV activated creation of hydroxyl groups, for example, in germanium-fluorine-doped silica and subsequent reaction with fluorine upon heat treatment. Alternatively such periodic intensity is introduced by illuminating with a single UV laser through a phase mask which is a patterning device modulating the intensity of the laser along the wire. It is not necessary to split the beam but to either sweep the laser over the mask or sweep the mask through the laser beam. The gratings can be interrogated using a hand held spectrometer such as Ocean Optics with a white light LED source. Depending upon the periodicity of the grating the grating will be wavelength selective returning preferentially the wavelength of light diffracted by the grating. The gratings are temperature sensitive and therefore a change in wavelength of the returned light is analyzed through the hand held spectrometer to measure temperature. The temperature sensitivity is 9–15 picometers/K. The gratings are strain sensitive; and using the above procedure are used to measure strain to 1–2 picometers/microstrain.

EXAMPLE 10

Bar encoding is achieved by utilizing glasses that are photonucleated to form glass ceramics. Thus a periodic variation in the crystal content of the glass is written using light in a similar manner to the Bragg gratings. Periodic variation in the crystallinity of the glass (ceramic) is analyzed using a hand held spectrometer such as Ocean Optics in terms of periodic changes in the reflection coefficient from the microwire. By melting lithium aluminosilicate glass doped with silver and cerium and photonucleating the glass periodically as described above, one creates differential chemical durability and the crystalline phase is preferentially soluble in 5 wt % aqueous HF solution. Periodic strain relief based upon the periodic variation in the glass thickness causes a periodic variation in the magnetic properties of the wire measured as described earlier. Glass that contains a transition metal such as copper or contains a semi metal such as arsenic exposure to hydrogen and heat treatment of the wire develops colloids of metal in the glass, which render the glass opaque and change the reflectivity of the glass. The wire is masked with a bar code negative which is not permeable to hydrogen (e.g. sputtered metal). Wire is treated in hydrogen, which permeates into the uncovered regions and reacts with transition metal or semimetal. Colloids develop, changing reflectivity of the glass. The metal mask is etched off in weak nitric acid. When copper is used as the mask material, severe reduction causes a thin (nm's) layer of CuO to be formed on the surface of the glass. The resulting bar code is interrogated using a hand held bar code reader. For this application the microwire needs to have a glass coating of at least 15 µm.

Having thus described the invention in rather full detail, it will be understood that such detail need not be strictly adhered to but that various changes and modifications may suggest themselves to one skilled in the art, all falling within the scope of the present invention as defined by the subjoined claims.

What is claimed is:

1. A glass-coated microwire, comprising a magnetic amorphous or nanocrystalline alloy and having regions of locally altered magnetic domain structure providing multi-bit magnetic encoding of the microwire.

2. An article comprising a single segment of the glass-coated microwire recited by claim 1.

3. The article of claim 2, in which the alloy is an Fe-based amorphous alloy.

4. The article of claim 2, in which the alloy is a Co-based amorphous alloy.

5. The microwire of claim 1, wherein the glass coating is locally thinned in selected bands extending down the length of the microwire, the selected bands providing the regions of locally altered magnetic domain structure.

6. The microwire of claim 1, produced by a process comprising selective impingement of a plurality of laser beams onto the microwire during a drawing thereof to produce the regions of locally altered magnetic domain structure.

7. The microwire of claim 1, further encoded optically by incorporation of a dopant in the glass coating of the microwire.

8. An article comprising a single segment of the glass-coated microwire recited by claim 7.

9. The microwire of claim 1, further encoded optically by incorporation of a plurality of dopants in the glass coating of the microwire, the plurality providing a multi-bit optical encoding.

10. An article comprising plural segments of the glass-coated microwire recited by claim 1.

11. The article of claim 10, wherein the plural segments are formed as a bundle.

12. A method for producing a multi-bit, magnetically encoded, amorphous alloy containing, glass-coated microwire comprising the steps of:
   a. loading a glass preform with alloy having a requisite chemistry;
   b. initiating and stabilizing a microwire drawing process;
   c. activating and adjusting select laser light beam sources;
   d. directing and adjusting select laser light beams to graze at a predetermined penetration of the surface of microwire being drawn; and
   e. ensuring constancy of process to provide consistent magnetic encoding along length of microwire being drawn.

13. A method for producing a multi-bits, optically encoded, amorphous alloy containing, glass-coated microwire, comprising the steps of:
   a. initializing and stabilizing a glass preform making process, starting with glass containing selective dopants;
   b. initiating and stabilizing a microwire drawing process;
   c. initializing and stabilizing post-forming encoding procedures using Bragg grating writing;
   d. initializing bar encoding by a masked hydrogen reduction of dopants in the glass; and
   e. initializing bar encoding by a photocrystallization and subsequent heat treatment or etching of the glass.

14. A method for producing a bundled microwire in a single-step drawing operation, comprising the steps of:
   a. initializing and stabilizing a glass preform making process to result in glass preforms that have multiple internal chambers;
   b. loading each of the internal chambers of the glass preform with an alloy of an amorphous-forming;
   c. initiating and then stabilizing the compound microwire drawing process; and
   d. ensuring constancy of process to provide consistent magnetic encoding along length of microwire being drawn.

* * * * *